2,721,142
MEAT-COATING COMPOSITION AND METHOD

Byron M. Shinn and Wesley H. Childs, Chicago, Ill., assignors to Armour and Company, Chicago, Ill., a corporation of Illinois No Drawing. Application November 4, 1953, Serial No. 390,253

10 Claims. (Cl. 99—169)

This invention relates to a meat-coating composition and process. The invention is particularly useful in providing a coating for frozen cuts of meat and especially for cuts of meat that are boned, rolled and tied. The coating has been used with especially good results on frozen veal cuts which are boned, rolled and tied, that is, on rolled veal roasts.

This application is a continuation-in-part of our copending application Serial No. 140,954, filed January 27, 1950 and now abandoned.

Heretofore, it has been the practice to wrap cuts of meat, and particularly those which are boned, rolled and tied, in caul fat. This is done as a means of affording juices for basting such meat which is naturally deficient in fat. Such caul fat, however, is not always available, and further has the disadvantage of becoming rancid after periods of storage, etc. Coating formulations have been used but such formulations have not been satisfactory because of the tendency of the material to char in the cooking operation, and also there is a tendency for the coating to sink or drop away from the meat during the cooking step.

In the coating formulations employed, it has been common to use flour for the purpose of obtaining a white color and also for preventing substances such as gelatin, which is a common ingredient, from sticking during the cooking operation. The flour, while serving a useful purpose in preventing the sticking of substances such as gelatin, is undesirable because of its tendency to char and thus to form black specks in the cooked product, and while the flour produces a white coating, the coating lacks luster.

There has long been a need for a coating formulation in which flour and similar material which forms a char may be omitted while at the same time preventing the sticking characteristics of gelatin and causing the coating to cling to the meat body during the cooking step. It is important that such coating also be one which is attractive in appearance, supplying the necessary fat to the meat during cooking, while also remaining as a stable emulsion through a period of time suitable for commercial operations involving the dipping or coating of such meats.

An object of the present invention is to provide a coating formulation meeting the above-described requirements or needs and not subject to the objections set out. A still further object is to provide a coating method and product by which the desired amount of fat is supplied to cuts of meat while forming an attractive covering therefor, the coating having less tendency to sink away from the meat during cooking and also having a less tendency toward charring than when ordinary coatings are used. Yet another object is to provide a coating of substantial strength so as to withstand handling while giving the coated meat cuts an attractive appearance, the formulation being such that a stable emulsion is produced which is available over a long period of time for application to roasts or meat cuts while at the same time having less tendency to sink away from the meat during the cooking operation. A still further object is to provide a coating composition of glistening white appearance in which flour and starches are not present while at the same time preventing the sticking of the gelatin component and avoiding charring in the cooking operation. Other specific objects and advantages will appear as the specification proceeds.

In prior coating formulations, it has been common to employ flour, starch and milk powder. While such ingredients are undesirable because of their tendency to char at the cooking-temperature for the meat, it has been assumed that at least some of them are necessary for the control of gelatin, which is found to be a necessary ingredient. While gelatin will char to some extent, it is found that flour, etc. will prevent the gelatin from sticking and thus greatly reduces its charring tendency. Unfortunately, flour itself also chars and the coatings produced further tend to sink away from the meat during cooking. The sinking away of the coating is particularly undesirable because it is the coating which supplies the fat and juices for basting such meat cuts which are naturally deficient in fat.

In one of its aspects this invention is concerned with a coating preparation for fat-deficient meats, comprising a stable emulsion of a meat-basting fat in water emulsified and stabilized with the combination of edible gelatin and a water-soluble edible cellulose gum. Coating preparations falling within the scope of this invention are further characterized by having a glistening white appearance when solidified, while being free of any white coloring material tending to char at meat-cooking temperatures.

Suitable fats for use in practicing the present invention can be designated as meat-basting fats. Fats as distinguished from oils are usually in a solid or semi-solid state at ordinary room temperature, and this characteristic thickness of fats at ordinary temperatures is desirable for the purposes of this invention. The particular fat employed will usually vary with the type of meat being roasted. For example, it will ordinarily be desirable to employ beef fat rather than pork fat for basting veal roasts as a matter of taste. Rendered beef fat, sometimes called "oleo stock" is particularly desirable for use in producing coatings on rolled veal roasts, with which the present invention has particular utility. However, it will be understood that pork, mutton, or vegetable fats can also be used in practicing this invention.

Any edible gelatin can be used in the meat-coating preparation. Particularly good results have been obtained with gelatin having a bloom of about 225. However, it will be understood that gelatin of different characteristics can be used.

The term "cellulose gum" as used herein is intended to designate not only sodium carboxymethyl cellulose, but also other cellulose derivatives of similar properties, such as the water-soluble non-toxic cellulose ethers. Among the cellulose gums which are suitable for use in practicing the present invention can be listed the following: hydroxyethyl cellulose, methylhydroxyethyl cellulose, methyl cellulose, methylethyl cellulose, cellulose sulfates like sodium cellulose sulfate, and glycolic acid salts like sodium, potassium or ammonium carboxymethyl cellulose. As indicated, the cellulose gum should be water-soluble or dispersable and non-toxic or edible. The cellulose glycolates are preferred and, in particular, sodium carboxymethyl cellulose.

While the proportions of the various ingredients in the meat-coating preparation can be varied in accordance with the present invention, in general it is preferred that the ingredients are in the proportions by weight as set out below:

|                    | Per cent    |
|--------------------|-------------|
| Meat-basting fat   | 30 to 60    |
| Edible gelatin     | 2 to 12     |
| Cellulose gum      | 0.05 to 3   |
| Water              | 30 to 60    |

Excellent results have been obtained with formulations employing the ingredients in the following proportions:

|                    | Per cent    |
|--------------------|-------------|
| Meat-basting fat   | 40 to 50    |
| Edible gelatin     | 4 to 9      |
| Cellulose ether    | 0.1 to 0.5  |
| Water              | 38 to 55    |

The ingredients of the coating may be mixed in any desired manner. We prefer to mix the cellulose gum and the gelatin in the dry state. This dry mixture is liquefied by soaking in water and subsequent heating with agitation. The fat, in melted condition, is then added and thorough agitation is maintained until emulsion results. The prepared roasts, such as rolled veal roasts, are then preferably dipped into this emulsion. It is possible to prepare the coating emulsion by adding the meat-basting fat in solid form to the heated mixture of water, gelatin and cellulose gum, the heated mixture being sufficient to melt the fat. Oleo stock (rendered bovine fat) is preferred when veal roasts are to be coated.

Under plant conditions, it is desirable to prepare a quantity of emulsion at one time and use this for dipping or application to the meat over a period of six to eight hours. The cellulose gum acts not only as a good emulsifier but as a stabilizer for maintaining the emulsion for the length of time desired. Since the formulation is such that a stable emulsion is produced and the emulsion is thus available over a long period of time for application to roasts, the coating product is of great value in meeting plant conditions. The emulsion is preferably maintained at a temperature ranging from 105° F. to 145° F. to avoid crystallization of the fat and subsequent graining out and also to provide a proper viscosity for the dipping of the prepared meat.

The strength and viscosity of gelatin solutions deteriorate with time and temperature. However, the presence of the cellulose gum appears to overcome such deterioration and the protective colloidal action of the gum assists markedly in preventing heat deterioration.

A cellulose gum like sodium carboxymethyl cellulose is a critical ingredient and we have not been able to find other emulsifying agents which cooperate with the gelatin to produce the necessary stability while also permitting the omission of flour and other charring ingredients, and while also producing a glistening white and attractive product having less tendency to sink away from the meat during heating.

The use of flour in present-day coating is effective in giving a white coating but the color lacks luster and is "dead" in color effect. In the present process the use of white coloring material, such as flour, is entirely eliminated. The oleo stock has its usual light yellow color while the gelatin, cellulose gum and water are colorless. As a result of the process, an unexpected result occurs in that the coating turns out to be snow white with high luster and presenting a glistening white appearance. Why this result is obtained, we are unable to state but the coating thus formed is far more attractive by reason of its luster while at the same time having less tendency to char and to sink away from the meat during cooking.

While the preferred temperatures at which the emulsion is maintained range from 105° F. to 145° F., it is possible to use higher temperatures and this may be desirable if the cuts are frozen to a lower temperature than usual and are at a lower temperature than usual when being dipped. The temperatures of the meat at dipping (outside surfaces of the meat) are preferably within the range of 45° to minus 20° F. The condensation of moisture from the surface of the meat dipped and the evaporation of water from the emulsion during the prolonged period of heating and dipping of meat have no adverse effects upon the stability of the emulsion.

Most cellulose gums are quite stable to heat. For example, sodium carboxymethyl cellulose has a browning range of from 374° F. to 401° F. and a charring range from 455° F. to 478° F. Since the meat may be roasted or cooked at 320° F. or thereabout, the browning range and charring range above indicated is avoided, and similar results can be obtained with other cellulose gums.

Cellulose gums of different viscosities may be used. By proper adjustment of the water content, we may use either high, medium or low viscosity cellulose gums. We prefer the higher viscosity gums because less is required to produce a good coating. By intimately mixing the cellulose gum with gelatin, both materials being in the dry state, and by adding the dry mixture slowly to water with substantial agitation and with sufficient heat for liquefying the gelatin, the cellulose gum is thoroughly dispersed throughout the mixture and is effective even in the small amounts indicated for producing the above-mentioned results.

The new coating, by reason of the stability of the emulsion, is applicable for plant operations. Its cost is low. The coating has sufficient strength to withstand handling. The coated roasts or cuts of meat are given an appetizing appearance, whether in the frozen or defrosted state, by reason of the glistening white color of the coating, and the coating carries a large quantity of fat for affording juices for the basting of the fat-deficient meat.

It has been found that seasoning, such as sodium chloride, monosodium glutamate, protein hydrolysate, pepper, spices, etc. may be effectively incorporated into the meat-coating preparations of this invention without impairing the stability thereof. For example, a seasoning-concentration of sodium chloride can be used so that the coating is effective in seasoning the meat as it is being cooked, while at the same time the coating shows marked stability during the period prior to the cooking of the meat. Preferably, from about .5 to 2% by weight of sodium chloride is used in the meat-coating and seasoning preparation.

This invention is further illustrated by the following specific examples.

*Example I*

About 0.2% of sodium carboxymethyl cellulose and 5% of gelatin were mixed in the dry state. To this was added about 51.5% of water and the mixture was heated and agitated. About 41.8% of oleo stock was melted and this was added to the water, cellulose and gelatin mixture, and the mass agitated until an emulsion resulted. The 1.5% of salt was added either in the early mixing stage of the cellulose, gelatin and water, or to the emulsion after the fat had been added. The resulting emulsion was then applied to the meat rolls, preferably by dipping the meat rolls in the emulsion.

*Example II*

The process was carried out as described in Example I, except that the water was 53.0%, the oleo stock 40.3%, the gelatin 5.0%, the salt 1.5%, and the cellulose gum 0.2%.

*Example III*

The process was carried out as described in Example I, except that the water was 53%, the oleo stock 39.8%, the gelatin 5.0%, the salt 2%, and the cellulose gum 0.2%.

*Example IV*

Following the procedure of Example I, except that salt was omitted, a number of preparations were prepared using various cellulose gums, the ingredients being combined in the following proportions:

|                    | Percent |
|--------------------|---------|
| Rendered beef fat  | 41.84   |
| Water              | 50.82   |
| Edible gelatin     | 7.14    |
| Cellulose gum      | 0.20    |

Among the cellulose gums employed were methyl cellulose, hydroxyethyl cellulose, and sodium cellulose sulfate. The resulting emulsions were similar in nature to emulsions prepared with sodium carboxymethyl cellulose, and upon solidification the meat-coating preparations had the same glistening white appearance as those prepared with sodium carboxymethyl cellulose.

*Example V*

A number of different meat-coating preparations were produced according to the method previously described, using methyl cellulose as the cellulose gum. Frozen rolled veal roasts were satisfactorily coated with these emulsions, whose composition is indicated below:

| Water | 56.97 | 50.64 | 47.97 | 50.57 |
|---|---|---|---|---|
| Oleo Stock | 36.61 | 43.65 | 46.62 | 44.29 |
| Edible Gelatin | 6.25 | 5.55 | 5.26 | 5.00 |
| Cellulose Gum | 0.17 | 0.16 | 0.15 | 0.14 |

*Example VI*

Frozen veal roasts were satisfactorily coated with coating compositions employing hydroxyethyl cellulose as the cellulose gum which had the following composition:

| Water | 56.97 | 50.64 |
|---|---|---|
| Oleo Stock | 36.61 | 43.65 |
| Edible Gelatin | 6.25 | 5.55 |
| Cellulose Gum | 0.17 | 0.16 |

While in the foregoing specification we have set forth certain examples in considerable detail, it will be understood that such details may be varied by those skilled in the art without departing from the spirit of our invention.

We claim:

1. A meat-coating preparation, comprising an emulsion composed principally of a meat-basting fat and water while also containing edible gelatin and a water-soluble non-toxic cellulose gum as essential ingredients, the proportions by weight of said ingredients ranging from about 30 to 60% of meat-basting fat, 30 to 60% of water, 2 to 12% of edible gelatin, and 0.05 to 3% of the cellulose gum.

2. A meat-coating preparation, comprising an emulsion composed principally of rendered beef fat and water while also containing edible gelatin and a water-soluble non-toxic cellulose ether as essential ingredients, the proportions by weight of said ingredients ranging from about 40 to 50% of the fat, 38 to 55% of water, 4 to 9% of the gelatin, and 0.1 to 0.5% of the cellulose ether.

3. The meat-coating preparation of claim 2 in which said cellulose ether is a cellulose glycolate.

4. The meat-coating preparation of claim 2 in which said cellulose ether is sodium carboxymethyl cellulose.

5. As a coating preparation for fat-deficient meat, a stable emulsion of a meat-basting fat in water emulsified and stabilized with the combination of edible gelatin and a water-soluble non-toxic cellulose ether, said emulsion containing said ingredients in the proportions by weight of about 30 to 60% of the fat, 30 to 60% of water, 2 to 12% of the gelatin, and 0.05 to 3% of the cellulose ether, said coating preparation when solidified having a glistening white appearance while being free of any white color material tending to char at meat-cooking temperatures.

6. A meat-coating and seasoning preparation, comprising an emulsion containing a meat-basting fat, water, edible gelatin, a water-soluble non-toxic cellulose ether, and sodium chloride, the proportions by weight of said ingredients ranging from about 40 to 50% of the fat, 38 to 55% of water, 4 to 9% of the gelatin, 0.1 to 0.5% of the cellulose ether, and .5 to 2% of sodium chloride.

7. In a method of preparing fat-deficient meat for roasting, the steps of forming an emulsion containing a meat-basting fat, water, edible gelatin, and a cellulose gum, in the proportions by weight of about 30 to 60% of the fat, 30 to 60% of water, 2 to 12% of the gelatin, and 0.05 to 3% of the cellulose gum, and applying the emulsion thus formed to said meat to form a coating thereon having a glistening white appearance.

8. In a method of preparing a rolled veal roast for roasting, the steps of forming an emulsion containing rendered beef fat, water, edible gelatin, a water-soluble non-toxic cellulose ether, and sodium chloride, in the proportions of about 40 to 50% of the fat, 38 to 55% of water, 4 to 9% of the gelatin, 0.1 to 0.5% of the cellulose ether, and .5 to 2% of sodium chloride, and applying the emulsion thus formed to said veal roast to form a coating thereon having a glistening white appearance.

9. The meat-coating preparation of claim 1 in which said cellulose gum is selected from the group consisting of sodium carboxymethyl cellulose, methyl cellulose, hydroxyethyl cellulose, and sodium cellulose sulphate.

10. The method of claim 7 in which said cellulose gum is selected from the group consisting of sodium carboxymethyl cellulose, methyl cellulose, hydroxyethyl cellulose, and sodium cellulose sulphate.

References Cited in the file of this patent

UNITED STATES PATENTS

| 2,440,517 | Lesparre | Apr. 27, 1948 |
|---|---|---|
| 2,551,463 | Ramsbottom | May 1, 1951 |
| 2,558,042 | Cornwell | June 26, 1951 |